(12) United States Patent
Tofukuji (10) Patent No.: US 11,978,871 B2
(45) Date of Patent: May 7, 2024

(54) BATTERY AND VEHICLE (71) Applicant: TOYOTA JIDOSHA KABUSHIKI KAISHA, Toyota (JP)

(72) Inventor: Satoko Tofukuji, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 179 days.

(21) Appl. No.: 17/682,531

(22) Filed: Feb. 28, 2022

(65) Prior Publication Data
US 2022/0285751 A1    Sep. 8, 2022

(30) Foreign Application Priority Data

Mar. 2, 2021 (JP) ................. 2021-032804

(51) Int. Cl.
| | |
|---|---|
| *H01M 10/613* | (2014.01) |
| *H01M 10/625* | (2014.01) |
| *H01M 10/6557* | (2014.01) |
| *H01M 10/6568* | (2014.01) |

(52) U.S. Cl.
CPC ..... *H01M 10/613* (2015.04); *H01M 10/6557* (2015.04); *H01M 10/6568* (2015.04); *H01M 10/625* (2015.04)

(58) Field of Classification Search
None
See application file for complete search history.

(56) References Cited

U.S. PATENT DOCUMENTS

| | | | | |
|---|---|---|---|---|
| 11,791,506 | B2* | 10/2023 | Graves | H01M 10/625 |
| | | | | 165/80.4 |
| 2015/0188204 | A1* | 7/2015 | Hanada | H01M 10/6554 |
| | | | | 219/541 |
| 2017/0373287 | A1* | 12/2017 | Yamashita | H01M 50/367 |
| 2018/0316070 | A1 | 11/2018 | Lee et al. | |
| 2019/0315187 | A1* | 10/2019 | Masuda | H05B 1/0236 |
| 2020/0136207 | A1* | 4/2020 | Qiu | H01M 10/6567 |
| 2020/0227801 | A1* | 7/2020 | Kumar | H01M 10/63 |
| 2020/0365851 | A1* | 11/2020 | Ozawa | H01M 10/613 |
| 2021/0325126 | A1* | 10/2021 | Gao | F28D 20/028 |

FOREIGN PATENT DOCUMENTS

| | | |
|---|---|---|
| JP | 2014-191916 A | 10/2014 |
| JP | 2018-538662 A | 12/2018 |
| JP | 2019-212440 A | 12/2019 |
| WO | 2017/188560 A1 | 11/2017 |

* cited by examiner

Primary Examiner — Scott J. Chmielecki
(74) Attorney, Agent, or Firm — Dinsmore & Shohl LLP (57) ABSTRACT

Provided is a battery that includes a battery module having a battery cell, and a cooler including an inlet part through which refrigerant flows in from outside, and an outlet part through which the refrigerant flows out, and configured to cool the battery module as the refrigerant circulates inside the cooler. The cooler includes an inlet side flow passage that communicates with the inlet part and is provided at a position overlapping a heating region, and an outlet side flow passage that communicates with the inlet side flow passage and the outlet part, and is provided at a position overlapping a non-heating region.

5 Claims, 7 Drawing Sheets

BATTERY AND VEHICLE

CROSS-REFERENCE TO RELATED APPLICATION

This application claims priority to Japanese Patent Application No. 2021-032804 filed on Mar. 2, 2021, incorporated herein by reference in its entirety.

BACKGROUND

1. Technical Field

The disclosure relates to a battery and a vehicle.

2. Description of Related Art

In Japanese Unexamined Patent Application Publication (Translation of PCT Application) No. 2018-538662 (JP 2018-538662 A), a technology for cooling a battery cell is described, in which a refrigerant supply and circulation unit is provided inside a pack casing that accommodates a battery cell assembly including at least one battery cell and is provided with an inlet part through which refrigerant for cooling the battery cell flows in, and an outlet part through which the refrigerant flows out, at one side of the pack casing. With this technology, one refrigerant circulation hole is provided in each one of a plurality of lateral partition walls and vertical partition walls that form accommodating spaces where the battery cell assemblies are accommodated, respectively, so that the inlet part and the outlet part are communicated with each other in order to supply and circulate the refrigerant inside the pack casing.

SUMMARY

When a plurality of modules, such as battery cell assemblies, that generate heat is provided, and the technology like the one described in JP 2018-538662 A is used in order to circulate refrigerant for cooling, temperature of the refrigerant on an inlet side, such as the inlet part where the refrigerant flows in, and temperature of the refrigerant on an outlet side, such as the outlet part where the refrigerant flows out are compared. Then, the temperature of the refrigerant on the inlet side tends to be lower. Therefore, in JP 2018-538662 A, there has been a problem in that a difference between the temperature of the battery cell assembly positioned on the inlet side, and the temperature of the battery cell assembly positioned on the outlet side becomes large, and, due to a resistance value that changes according to the temperature difference, a current density is biased, and the calorific value is partially increased. As a result, degradation of the battery cell is accelerated.

The disclosure has been accomplished in the light of the above, and an object thereof is to provide a battery and a vehicle in which enlargement of temperature distribution inside a battery cell is restrained so that aging degradation of the battery cell is restrained.

A battery according to the disclosure includes a battery module having a battery cell, and a cooler including an inlet part and an outlet part. The cooler is configured to cool the battery module as refrigerant circulates inside the cooler. The refrigerant flows in through the inlet part from outside, and the refrigerant flows out through the outlet part. The battery module includes a heating region and a non-heating region. The cooler includes an inlet side flow passage and an outlet side flow passage. The inlet side flow passage communicates with the inlet part and is provided at a position overlapping the heating region, and the outlet side flow passage communicates with the inlet side flow passage and the outlet part, and is provided at a position overlapping the non-heating region.

Also, a plurality of battery cells is laminated in the battery module, and the inlet side flow passage is provided at a position overlapping the heating region in a laminating direction in which the battery cells are laminated.

Therefore, since the inlet side flow passage is provided at the position overlapping the heating region in the laminating direction in which the battery cells are laminated, it is possible to suppress temperature distribution of the battery module in the laminating direction as much as possible.

Further, the battery module includes a coated region in which an active material is coated, an uncoated region in which the active material is not coated, and a seal part provided to cover an outer peripheral side of the battery cell. The heating region is the coated region, and the non-heating region is the uncoated region and the seal part.

Therefore, since the inlet side flow passage is provided in the coated region of the heating region, it is possible to suppress temperature distribution of the battery module in the laminating direction as much as possible.

Also, the refrigerant moves from the inlet side flow passage to the outlet side flow passage.

Since the refrigerant moves from the inlet side flow passage to the outlet side flow passage, it is possible to cool the battery module efficiently.

Also, the refrigerant is fluid.

Since the refrigerant is fluid, it is possible to cool the battery module better than air cooling.

Also, a vehicle according to the disclosure includes a battery. The battery include a battery module having a battery cell, and a cooler that includes an inlet part through which refrigerant flows in from outside, and an outlet part through which the refrigerant flows out, and cools the battery module as the refrigerant circulates inside the cooler. The battery module includes a heating region and a non-heating region. The cooler includes an inlet side flow passage and an outlet side flow passage. The inlet side flow passage communicates with the inlet part and is provided at a position overlapping the heating region, and the outlet side flow passage communicates with the inlet side flow passage and the outlet part, and is provided at a position overlapping the non-heating region.

With the disclosure, because the inlet side flow passage is provided at the position overlapping the heating region of the battery module, and the outlet side flow passage is provided at the position overlapping the non-heating region of the battery module, it is possible to suppress enlargement of temperature distribution inside the battery cell. This causes an effect of suppressing aging degradation of the battery cell.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a schematic view describing a positional relationship between a cooler according to a related art, and the battery module where a shape of a flow passage of the cooler is seen through;

FIG. 12 is a schematic view of a positional relationship between the battery module and the cooler where the shape of the flow passage of the cooler is seen through;

DETAILED DESCRIPTION OF EMBODIMENTS

Hereinafter, a battery module according to an embodiment of the disclosure is described with reference to the drawings. The embodiment does not limit the disclosure. In the description below, the same reference numerals are given to the same parts, respectively.

Rough Structure of Vehicle

Figure 1:
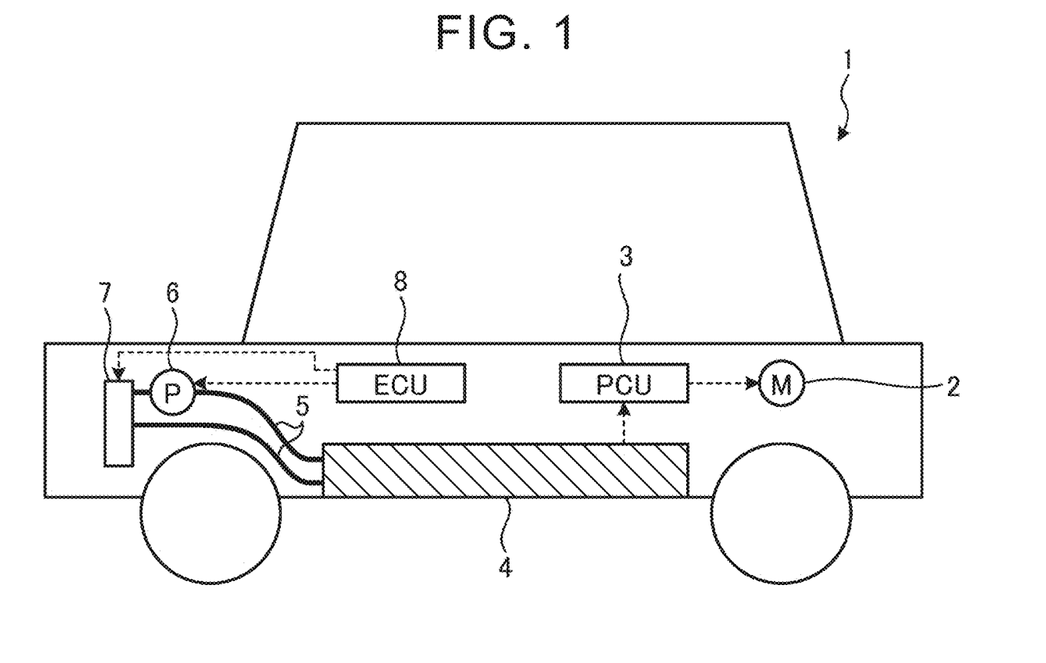
FIG. 1 is a schematic view of a rough structure of a vehicle on which a battery according to an embodiment is mounted.

FIG. 1 is a schematic view describing a rough structure of a vehicle on which a battery according to the embodiment is mounted. An electric vehicle (EV) powered by a motor or the like, a plug-in hybrid vehicle (PHV), or the like is assumed to be a vehicle 1 shown in FIG. 1.

The vehicle 1 includes a motor 2, a power control unit 3 (hereinafter, referred to as a "PCU 3"), a battery 4, a cooling pipe 5, an electric pump 6, a heat exchanger 7, and an electronic control unit (ECU) 8.

The motor 2 outputs power for running with use of electric power of the battery 4. The motor 2 is electrically connected with the battery 4 through the PCU 3. In the vehicle 1, the power output by the motor 2 is transmitted to driving wheels through a power transmission device.

The PCU 3 controls driving of the motor 2. The PCU 3 is constituted by at least an inverter that drives the motor 2, a boosting converter, and a DC/DC convertor. For example, in the PCU 3, the inverter exchanges direct current of the battery 4 into alternating current and supplies it to the motor 2.

The battery 4 stores electric power to be supplied to the motor 2. Specifically, the battery 4 is an electrical storage device that is able to charge electric power supplied from an external power source. The battery 4 is electrically connected with a charging plug of an external charging equipment through a charging port (not shown) provided in the vehicle 1, and charged with electric power supplied from the charging equipment. The battery 4 is constituted by a module in which a plurality of flat cells (battery cells) is laminated in the vertical direction, and a cooler that cools the module. The detailed structure of the battery 4 is described later.

The battery 4, the electric pump 6, and the heat exchanger 7 are connected with each other on a flow passage of the cooling pipe 5, and refrigerant that cools the battery 4 circulates in the cooling pipe 5. Here, any of air, water, mineral oil, synthetic oil, silicone oil, fluorine oil, insulating refrigerant (for example, alternative fluorocarbon refrigerant such as R134a), and insulating oil is used as the refrigerant. In this embodiment, a case is described where water is used as the refrigerant. The cooling pipe 5 is made of a nonconductive material, a conductive material, or the like. Specifically, the cooling pipe 5 is made of rubber, resin, aluminum, or the like.

The electric pump 6 causes the refrigerant to circulate inside the cooling pipe 5 based on control by the ECU 8. Specifically, the electric pump 6 takes in the refrigerant stored inside a reserve tank, and discharges the refrigerant to the cooling pipe 5 from a discharge port. The refrigerant discharged by the electric pump 6 circulates through the cooling pipe 5, the battery 4, and the heat exchanger 7 due to discharge pressure from the electric pump 6.

The heat exchanger 7 exchanges heat with the refrigerant circulating inside the cooling pipe 5 based on the control by the ECU 8 so that heat is radiated from the refrigerant. The heat exchanger 7 is constituted, for example, by a radiator and an electric fan.

The ECU 8 controls driving of the electric pump 6 and the heat exchanger 7. The ECU 8 is constituted by a memory, and a processor having hardware such as a central processing unit (CPU).

Detailed Structure of Battery

Figure 2:
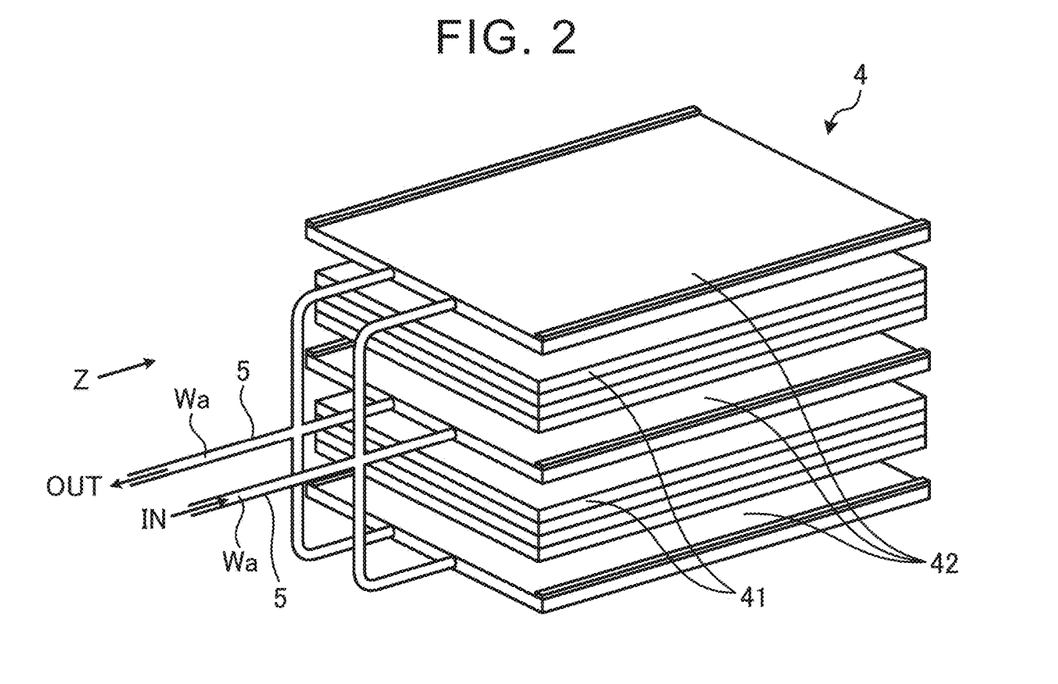
FIG. 2 is a perspective view of a rough structure of the battery.
Figure 3:
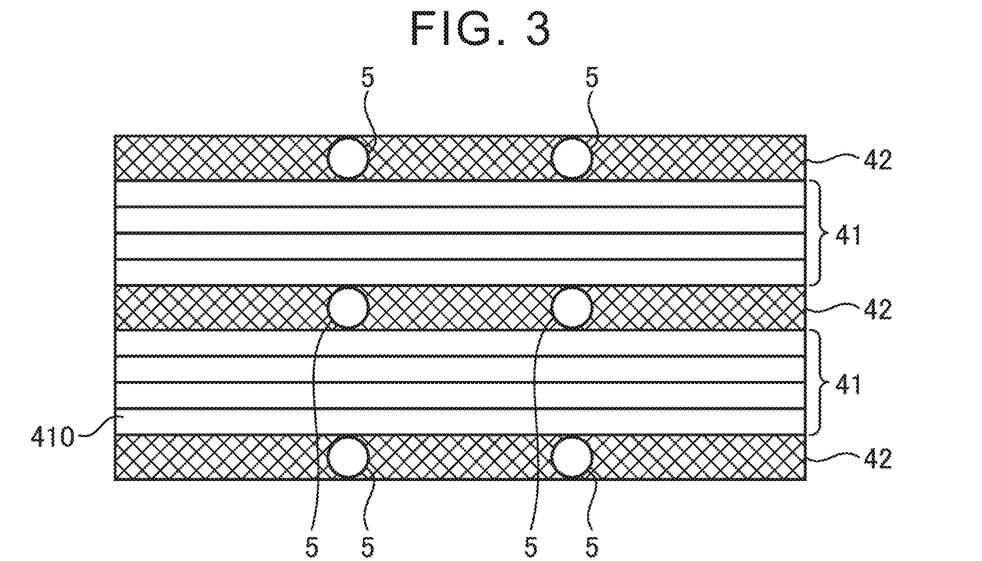
FIG. 3 is a side view of the battery seen from an arrow Z in FIG. 2.

Next, a detailed structure of the battery 4 is described. FIG. 2 is a perspective view describing a rough structure of the battery. FIG. 3 is a side view of the battery 4 seen from an arrow Z in FIG. 2.

As shown in FIG. 2 and FIG. 3, the battery 4 includes a plurality of the battery modules 41 and a plurality of the coolers 42. Specifically, as shown in FIG. 2 and FIG. 3, the battery 4 is constituted as the cooler 42, the battery module 41, the cooler 42, the battery module 41, and the cooler 42 are laminated in this order. In the battery 4 shown in FIG. 2 and FIG. 3, the two battery modules 41 are laminated. However, the number of the battery modules 41 to be laminated may be changed as appropriate as long as the battery modules 41 are laminated so that either an upper surface or a lower surface of each of the battery modules 41 is in contact with the cooler 42. Further, the number of the coolers 42 may be changed as appropriate. Furthermore, the laminating order of the layers in the battery 4 may be the order of, for example, the battery module 41, the cooler 42, the battery module 41, the battery module 41, the cooler 42, and the battery module 41 from the bottom.

First of all, a detailed structure of the battery module 41 is described. The battery module 41 is constituted as a plurality of flat plate-shaped battery cells 410 is laminated (see FIG. 3). For the battery cell 410 of the battery module 41, either a bipolar structure or a monopolar structure is used.

Bipolar Structure

Figure 4:
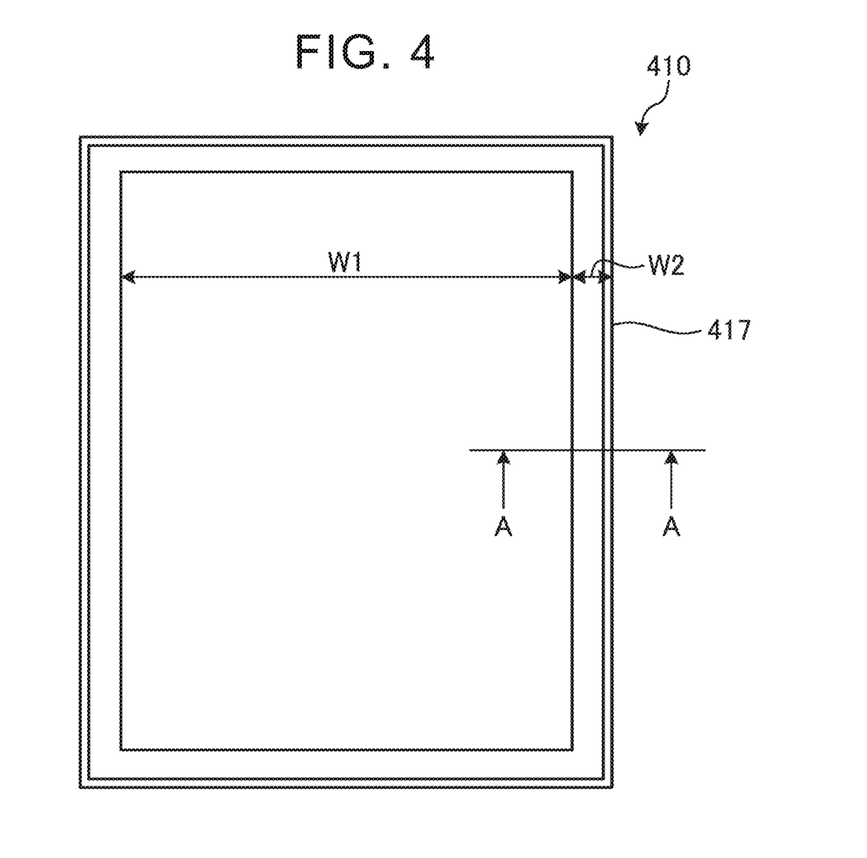
FIG. 4 is a top view of a battery cell of a battery module.
Figure 5:
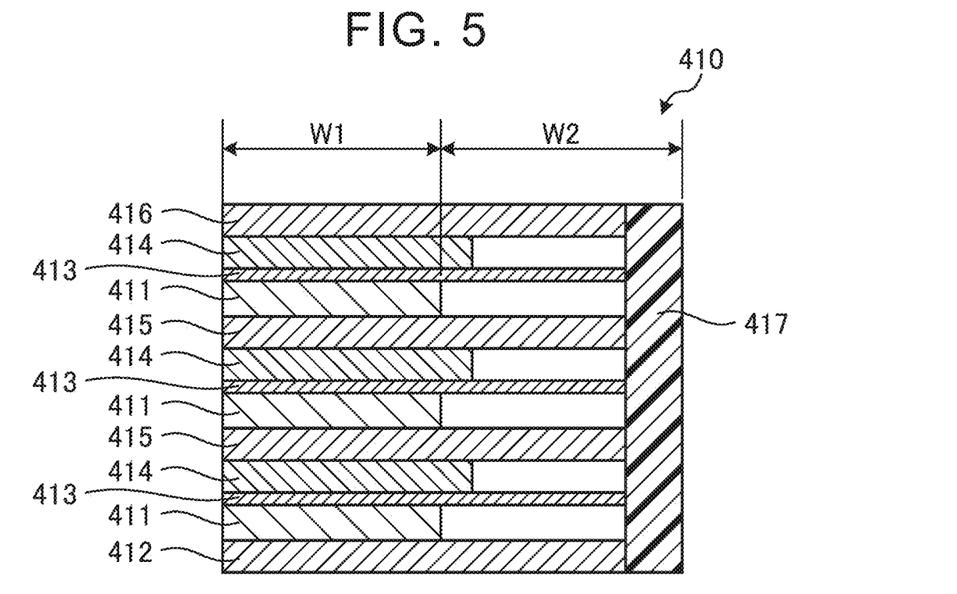
FIG. 5 is a sectional view taken along the line A-A in FIG. 4 in a case where a bipolar structure is employed for the battery cell of the battery module.

First of all, a case is described where the bipolar structure is employed for the battery cell 410 of the battery module 41. FIG. 4 is a top view of the battery cell 410 of the battery module 41. FIG. 5 is a sectional view taken along the line A-A in FIG. 4 in the case where the bipolar structure is employed for the battery cell 410 of the battery module 41.

As shown in FIG. 4 and FIG. 5, the battery cell 410 having the bipolar structure is constituted as a first electrode foil 412 where its surface side (one side) is coated with an cathode active material 411, a separator 413, an intermediate electrode foil 415 where its back surface side is coated with an anode active material 414 and its surface side is coated with the cathode active material 411, the separator 413, the intermediate electrode foil 415 where its back surface side is coated with the anode active material 414 and its surface side is coated with the cathode active material 411, the separator 413, and a second electrode foil 416 where its back surface side (one side) is coated with the anode active material 414, are laminated in this order. In FIG. 5, the number of the intermediate electrode foils 415 laminated is two. However, a given number of the separators 413 and the intermediate electrode foils 415 may be laminated between the first electrode foil 412 and the second electrode foil 416. Also, each of the first electrode foil 412, the intermediate electrode foil 415, and the second electrode foil 416 is made with use of aluminum or the like. Further, the battery cell 410 has a seal part 417 that is made from resin or the like that protects an outer peripheral side of the battery cell 410.

Moreover, in the battery cell 410, an area in each of the first electrode foil 412, the intermediate electrode foil 415, and the second electrode foil 416, where the cathode active material 411 and the anode active material 414 face each other is referred to as a heating region W1. Further, in the battery cell 410, an area including an active material uncoated region where the cathode active material 411 and the anode active material 414 are not coated, and the seal part 417 is referred to as a non-heating region W2.

Monopolar Structure

Figure 6:
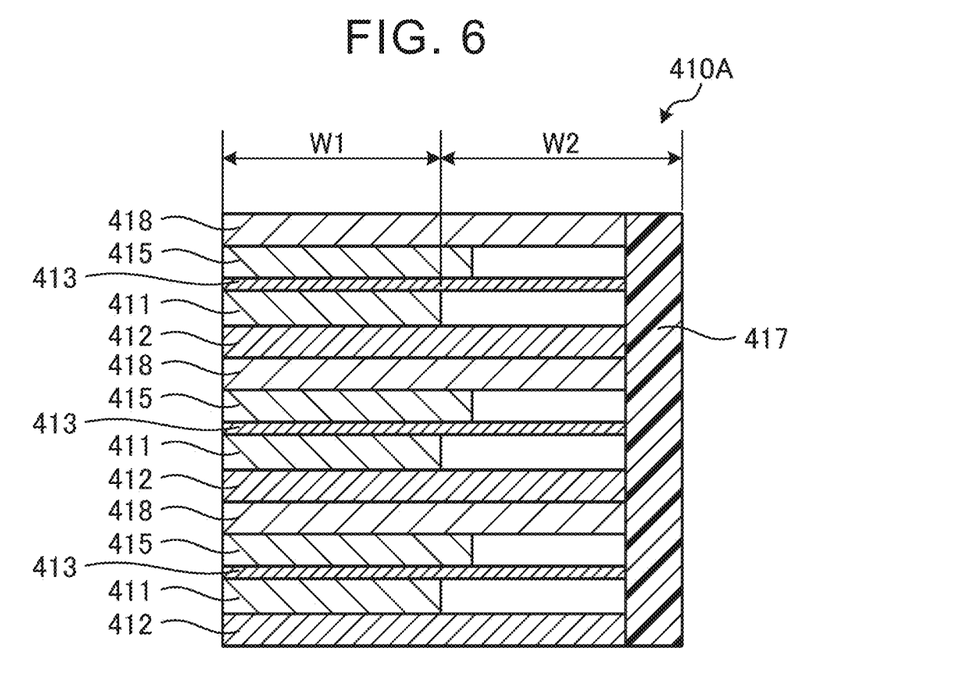
FIG. 6 is a sectional view taken along the line A-A in FIG. 4 in a case where a monopolar structure is employed for the battery cell of the battery module.

Next, a case is described where the monopolar structure is employed for the battery cell 410 of the battery module 41. FIG. 6 is a sectional view taken along the line A-A in FIG. 4 in the case where the monopolar structure is employed for the battery cell 410 of the battery module 41.

As shown in FIG. 4 and FIG. 6, a battery cell 410A with the monopolar structure is constituted as a plurality of sets of layers is laminated. The set of layer includes the first electrode foil 412 where its surface side (one side) is coated with the cathode active material 411, the separator 413, and a second electrode foil 418 where its back surface side is coated with an anode active material 414. The first electrode foil 412 is made from aluminum or the like. The second electrode foil 418 is constituted by copper or the like. Further, the battery module 41 includes the seal part 417 that is formed with resin or the like that protects an outer peripheral side of the battery cell 410A.

Furthermore, in the battery cell 410A, an area in each of the first electrode foil 412 and the second electrode foil 418 where the cathode active material 411 and the anode active material 414 face each other is referred to as the heating region W1. Also, in the battery cell 410A, an area including an active material uncoated region where the cathode active material 411 and the anode active material 414 are not coated, and the seal part 417 is referred to as the non-heating region W2.

Structure of Cooler

Figure 7:
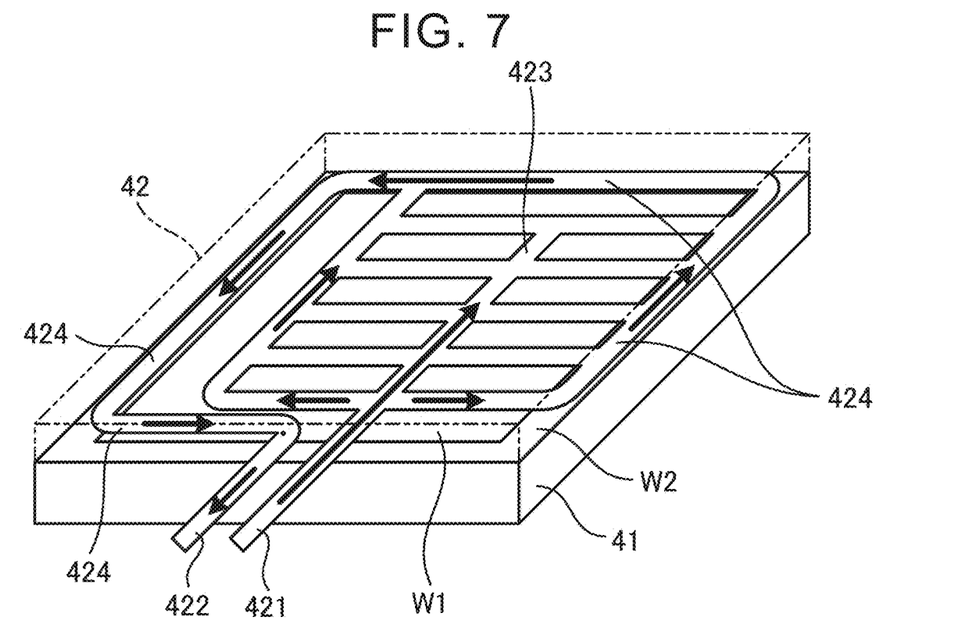
FIG. 7 is a perspective view schematically describing a positional relationship between a flow passage provided in a cooler, and the battery module.
Figure 8:
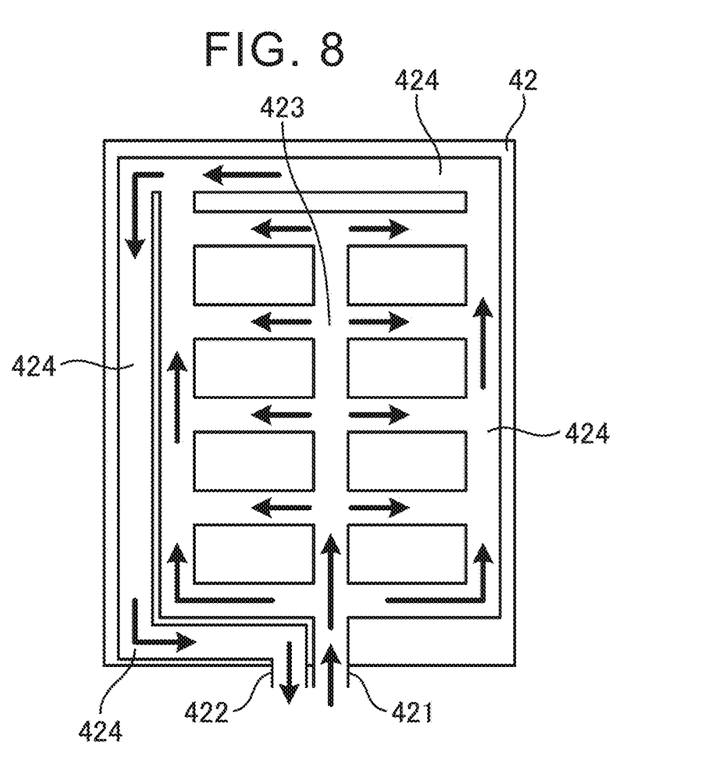
FIG. 8 is a plan view schematically describing the flow passage provided in the cooler.

Next, a structure of the cooler 42 is described in detail. FIG. 7 is a perspective view schematically describing a positional relationship between the flow passage provided in the cooler 42 and the battery module 41. FIG. 8 is a plan view that schematically describes the flow passage provided in the cooler 42. In FIG. 7 and FIG. 8, flows of the refrigerant are expressed by arrows.

As shown in FIG. 7 and FIG. 8, the cooler 42 includes an inlet part 421 and an outlet part 422. In the inlet part 421, refrigerant Wa is fed from the electric pump 6 through the cooling pipe 5. In the outlet part 422, the refrigerant Wa flows out to the cooling pipe 5. Further, the cooler 42 includes an inlet side flow passage 423 and an outlet side flow passage 424. The inlet side flow passage 423 communicates with the inlet part 421 and is provided at a position overlapping the heating region W1. The outlet side flow passage 424 communicates with the inlet side flow passage 423 and the outlet part 422, and is provided at a position overlapping the non-heating region W2. The cooler 42 is made from a conductive member, such as aluminum or the like.

The cooler 42 constructed as above cools the battery module 41 as the refrigerant Wa that flows into the cooler 42 from the inlet part 421 circulates the flow passage inside the cooler 42. Further, the cooler 42 positioned on the lowermost layer and the cooler 42 positioned on the uppermost layer function as an electrode of the battery 4 as they are electrically continuous with other layers.

Battery Module Cooling Effect by Cooler

Next, an effect of cooling the battery module 41 with use of the cooler 42 is described. Hereinafter, an effect of cooling the battery module 41 with a cooler according to a related art is described first. Then, an effect of cooling the battery module 41 with the cooler 42 according to the embodiment is described. Further, hereinafter, temperature is expressed by hatching. The thicker the hatching is, the higher the temperature is.

Figure 9:
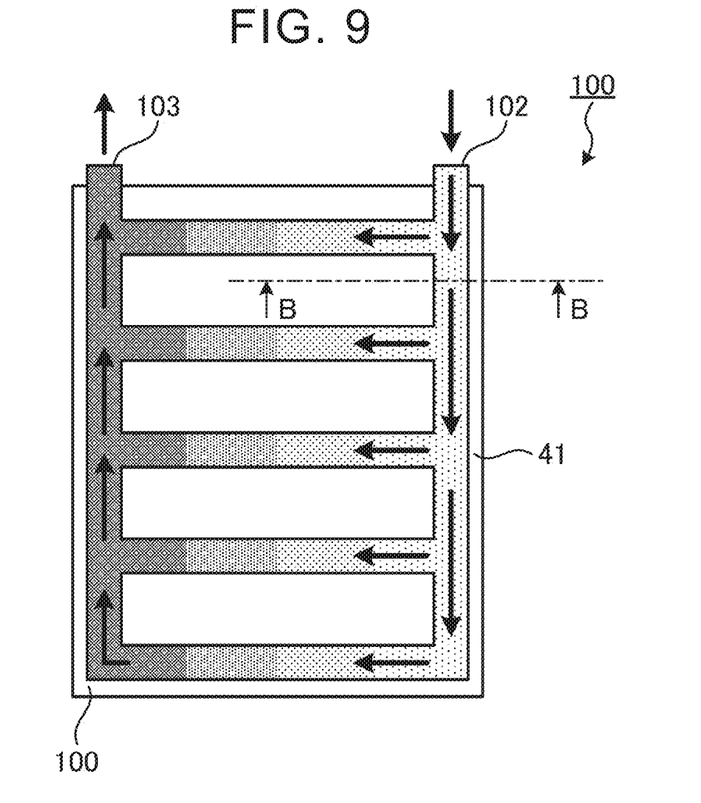
Figure 10:
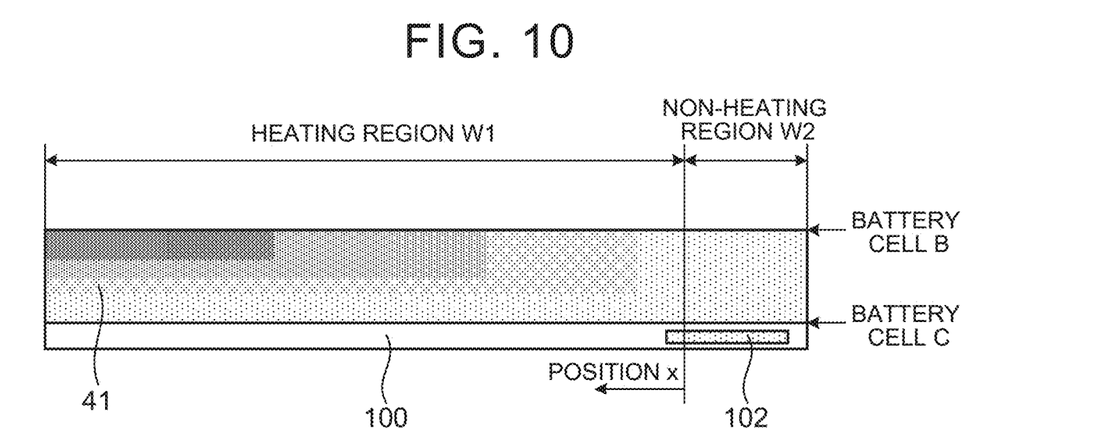
FIG. 10 is a schematic view showing an image of temperature of the battery module on a section taken along the line B-B in FIG. 9.
Figure 11:
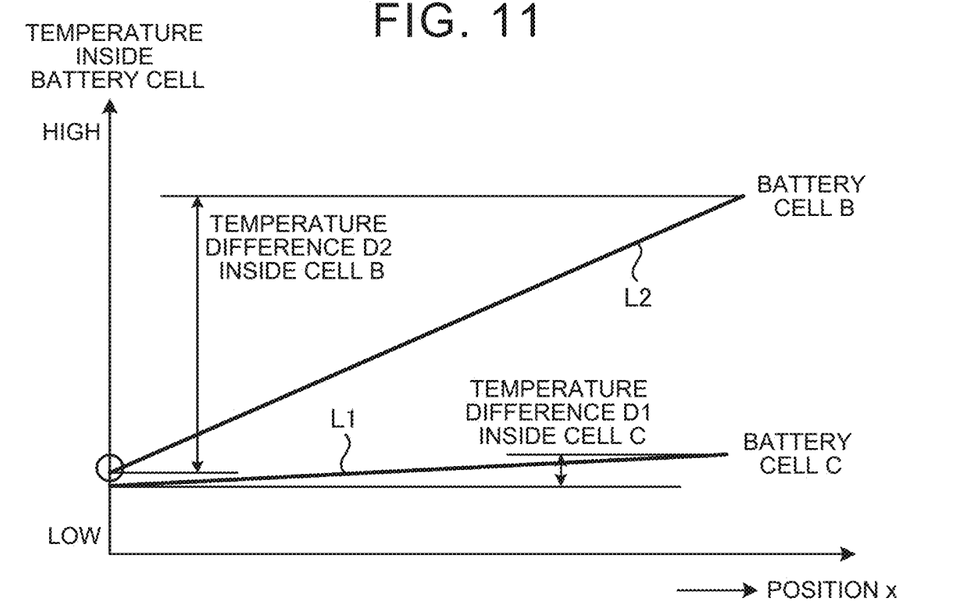
FIG. 11 is a graph showing temperature inside a battery cell with the cooler according to the related art, and positional relationships.

First of all, the related art is described. FIG. 9 is a schematic view describing a positional relationship between a cooler according to the related art, and the battery module 41 where a shape of a flow passage of the cooler is seen through. FIG. 10 is a schematic view showing an image of temperature of the battery module 41 on a section taken along the line B-B shown in FIG. 9. FIG. 11 is a graph showing temperature inside the battery cell 410 with the cooler according to the related art, and a positional relationship. In FIG. 11, a straight line L1 represents temperature of a battery cell C of the battery module 41 and a positional relationship of the battery cell C, and a straight line L2 represents temperature of a battery cell B of the battery module 41 and a positional relationship of the battery cell B.

As shown in FIG. 9 to FIG. 11, in a cooler 100 according to the related art, an inlet side flow passage 102 is provided on top of a non-heating region of the battery module 41, and an outlet side flow passage 103 is provided in the non-heating region of the battery module 41 (see FIG. 4). Therefore, in the cooler 100 according to the related art, a temperature difference D1 inside the battery cell C is small (see the straight line L1 in FIG. 11), while there is a large temperature difference D2 between an inlet side and an outlet side of the battery cell B (see the straight line L2 in FIG. 11). This means that, in the conventional cooler 100 according to the related art, an amount of heat received by the inlet side flow passage is small, and temperature of the battery cell B on an end portion side does not increase sufficiently. In the cooler 100 according to the related art, a temperature difference within the battery cell B is increased, and thus current density is biased. Then, a calorific value is partially increased, and degradation may thus be accelerated.

Figure 12:
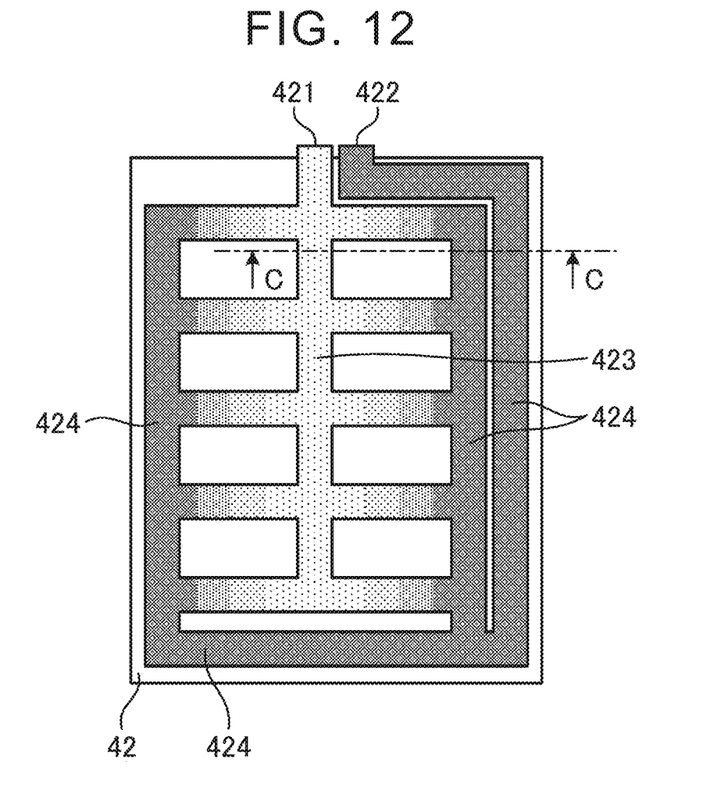
Figure 13:
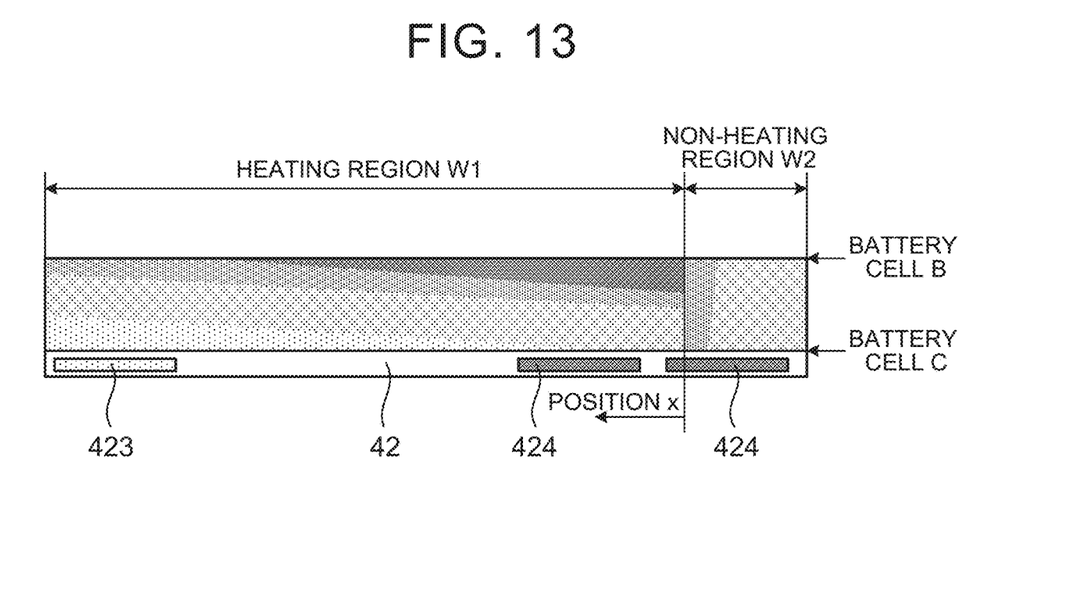
FIG. 13 is a schematic view of an image of temperature of the battery module on a section taken along the line C-C in FIG. 12.
Figure 14:
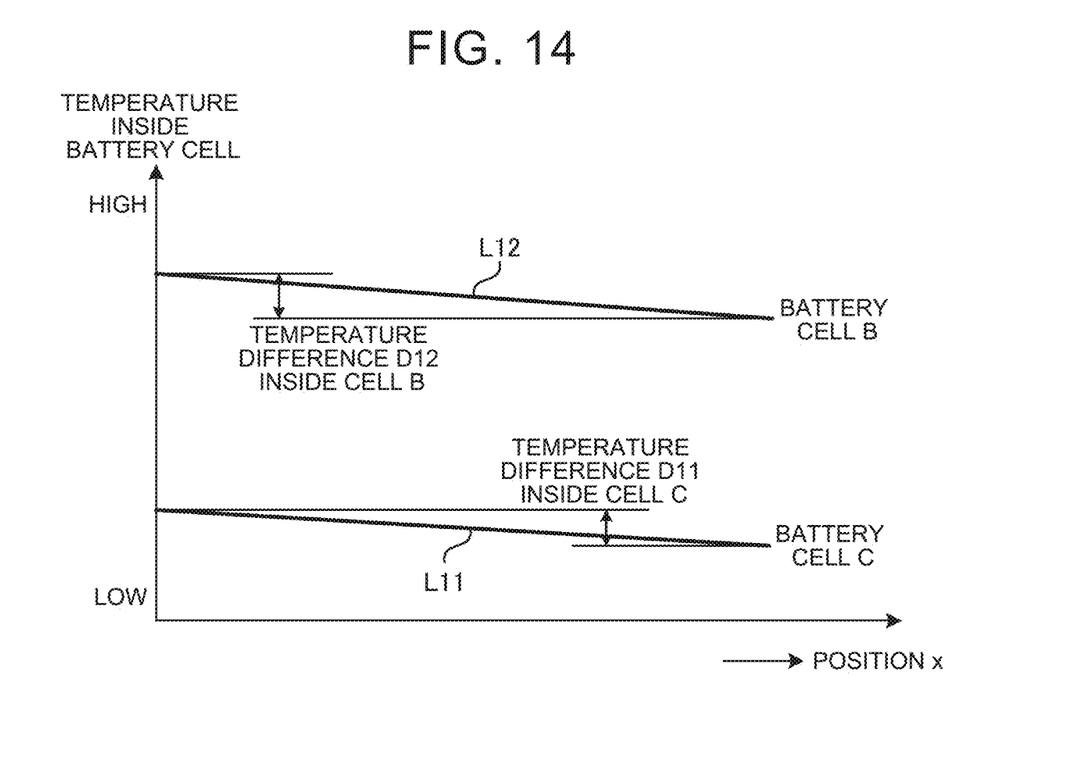
FIG. 14 is a graph showing temperature inside the battery cell with the cooler, and positional relationships.

Next, an effect of cooling the battery module 41 with use of the cooler 42 is described. FIG. 12 is a schematic view of a positional relationship between the battery module 41 and the cooler 42 where the shape of the flow passage of the cooler 42 is seen through. FIG. 13 is a schematic view of a temperature image of the battery module 41 on a section taken along the line C-C in FIG. 12. FIG. 14 is a graph showing temperature inside the battery cell 410 and a positional relationship. In FIG. 14, a straight line L11 represents temperature of the battery cell B of the battery module 41 and a positional relationship of the battery cell B, and a straight line L12 represents temperature of the battery cell C of the battery module 41 and a positional relationship of the battery cell C.

As shown in FIG. 12 to FIG. 14, in the cooler 42, the inlet side flow passage 423 is provided at a position overlapping the heating region W1, and the outlet side flow passage 424 is provided at a position overlapping the non-heating region W2. Therefore, the cooler 42 is able to reduce a temperature difference D11 inside the battery cell C (the straight line L11) and a temperature difference D12 inside the battery cell B (the straight line L12) on the inlet side and the outlet side. As a result, the cooler 42 suppresses temperature distribution of the battery module 41 in the laminating direction as much as possible, and is thus able to prevent temperature of a low-temperature part of the battery cell 410 away from the cooler 42 from being too low. Therefore, it is possible to prevent uneven current density as well as degradation of the battery module 41.

In the embodiment described so far, the inlet side flow passage 423 is provided at the position overlapping the heating region W1 of the battery module 41, and the outlet side flow passage 424 is provided at the position overlapping the non-heating region W2 of the battery module 41. Thus, it is possible to restrain enlargement of temperature distribution in the battery cell 410, and aging degradation of the battery cell 410 is therefore restrained.

Also, in the embodiment, since the inlet side flow passage 423 is provided at the position overlapping the heating region W1 in the laminating direction in which the battery cells 410 are laminated, it is possible to suppress temperature distribution of the battery module 41 in the laminating direction as much as possible, in addition to the battery cell C laminated directly on top of the cooler 42.

Also, in the embodiment, since the inlet side flow passage 423 is provided in the uncoated region of the heating region W1, it is possible to suppress enlargement of temperature distribution of the battery cell B as much as possible.

Further, in the embodiment, since the refrigerant Wa moves from the inlet side flow passage 423 to the outlet side flow passage 424, it is possible to cool the battery module 41 efficiently.

Further, in the embodiment, since the refrigerant Wa is fluid, it is possible to cool the battery module 41 better than air cooling.

Modification

In this embodiment, each of the inlet side flow passage 423 and the outlet side flow passage 424 of the coolers 42 that are laminated in the battery 4 is arranged parallel to each other in the laminating direction. However, the disclosure is not limited to this, and each of the inlet side flow passage 423 and the outlet side flow passage 424 may be arranged so that, for example, the inlet side flow passage 423 and the outlet side flow passage 424 are orthogonal to each other in each of the laminated cooler 42.

Other Embodiments

A person skilled in the art will easily arrive at further effects and modifications. A wider range of aspects of the disclosure is not limited to the specific details and representative embodiment described and stated above. Therefore, it is possible to make various changes without departing from the spirit and range of the whole concept of the disclosure defined by the attached claims and equivalents thereof.

What is claimed is:

1. A battery, comprising:
a battery module having a battery cell; and
a cooler including an inlet part through which refrigerant flows in from outside, and an outlet part through which the refrigerant flows out, the cooler being configured to cool the battery module as the refrigerant circulates inside the cooler, wherein:
the battery module includes:
a heating region;
a non-heating region;
a coated region in which an active material is coated;
an uncoated region in which the active material is not coated; and
a seal part provided to cover an outer peripheral side of the battery cell;
the heating region is the coated region; and
the non-heating region is the uncoated region and the seal part; and
the cooler includes:
an inlet side flow passage that communicates with the inlet part and is provided at a position overlapping the heating region; and
an outlet side flow passage that communicates with the inlet side flow passage and the outlet part and is provided at a position overlapping the non-heating region.

2. The battery according to claim 1, wherein:
a plurality of battery cells is laminated in the battery module; and
the inlet side flow passage is provided at a position overlapping the heating region in a laminating direction in which the battery cells are laminated.

3. The battery according to claim 1, wherein the refrigerant moves from the inlet side flow passage to the outlet side flow passage.

4. The battery according to claim 1, wherein the refrigerant is fluid.

5. A vehicle comprising the battery according to claim 1.

* * * * *